United States Patent [19]

Butler

[11] Patent Number: 4,667,142
[45] Date of Patent: May 19, 1987

[54] THREE-WAY POWER SOURCE CIRCUIT

[75] Inventor: James E. Butler, Bridgeport, Conn.

[73] Assignee: TIE/Communications, Inc., Shelton, Conn.

[21] Appl. No.: 774,035

[22] Filed: Sep. 9, 1985

[51] Int. Cl.⁴ .................................................. H02J 7/00
[52] U.S. Cl. ............................................ 320/6; 320/2; 320/16; 320/17
[58] Field of Search ........................ 320/2, 6, 5, 16, 17

[56] References Cited

U.S. PATENT DOCUMENTS

| | | | |
|---|---|---|---|
| 3,319,074 | 5/1967 | Koch | 320/5 X |
| 4,025,860 | 5/1977 | Shibata et al. | 320/6 X |
| 4,122,396 | 10/1978 | Grazier et al. | 320/2 X |
| 4,140,957 | 2/1979 | Rapp | 320/6 X |
| 4,494,854 | 1/1985 | Yamaga et al. | 320/2 X |

Primary Examiner—Patrick R. Salce
Assistant Examiner—Anita M. Ault
Attorney, Agent, or Firm—Kenyon & Kenyon

[57] ABSTRACT

A three-way power source circuit for portable electronic equipment, such as a radio, is disclosed. The power source circuit comprises a solar energy cell, a rechargeable battery and a standard nonrechargeable dry cell. A transistor couples the solar cell and rechargeable battery to a common point of the circuit, and a second transistor couples a standard dry cell to the common point. The common point provides one of the power output lines to the portable electronic equipment. The solar cell, rechargeable battery and standard dry cell return lines are coupled to a further common point which serves as the return line for power supplied to the portable electronic equipment. Switches are provided for eliminating the flow of current to the portable electronic equipment. The three-way power source circuit allows the solar cell to recharge the rechargeable cell when sufficient light is present. When insufficient light is present, the standard dry cell or the rechargeable battery, if it is sufficiently charged, provide power for the portable electronic equipment. If the standard dry cell is depleted, then the rechargeable cell/or the solar cell provide the primary power for the portable electronic equipment.

6 Claims, 2 Drawing Figures

THREE-WAY POWER SOURCE CIRCUIT

BACKGROUND OF THE INVENTION

The present invention relates to a three-way power source circuit for operating electrical apparatus such as portable radios, etc. The power source circuit comprises a means for deriving power from a solar energy source, a rechargeable battery source and a standard dry cell source, interconnected such that any one of the three sources of power can operate electronic apparatus connected to the power source circuit and such that the solar energy source can operate as a source of charging voltage for the rechargeable battery source.

SUMMARY OF THE INVENTION

It is an object of the present invention to provide a three-way power source circuit for portable electronic equipment such as radios.

It is a further object of the present invention to provide a three-way power source circuit for portable electronic equipment which includes a solar derived energy source, a rechargeable battery source and a standard dry cell source.

It is yet a further object of the present invention to provide a three-way power source circuit for portable electronic equipment interconnected in such a manner that a source of solar derived energy can provide charging voltage for a rechargeable battery connected into the circuit.

It is a further object of the present invention to provide a three-way power source circuit such that when one of the power sources fails to provide power, one of the other power sources can take its place.

These and other objects of the present invention are achieved by a three-way power source circuit for portable electronic equipment comprising means for deriving power from a solar energy source, battery means rechargeable by the means for deriving power from a solar energy source, nonrechargeable battery means, first isolating means for coupling the rechargeable battery means and the means for deriving power from a solar energy source to a common point, and second isolating means for coupling the nonrechargeable battery means to the common point, the common point being coupled to the portable electronic equipment for supplying power thereto.

Other objects, features and advantages of the present invention will be apparent from the detailed description which follows.

BRIEF DESCRIPTION OF THE DRAWINGS

The invention will be described in greater detail in the following detailed description with reference to the drawing figures, in which.

DETAILED DESCRIPTION

Figure 1:
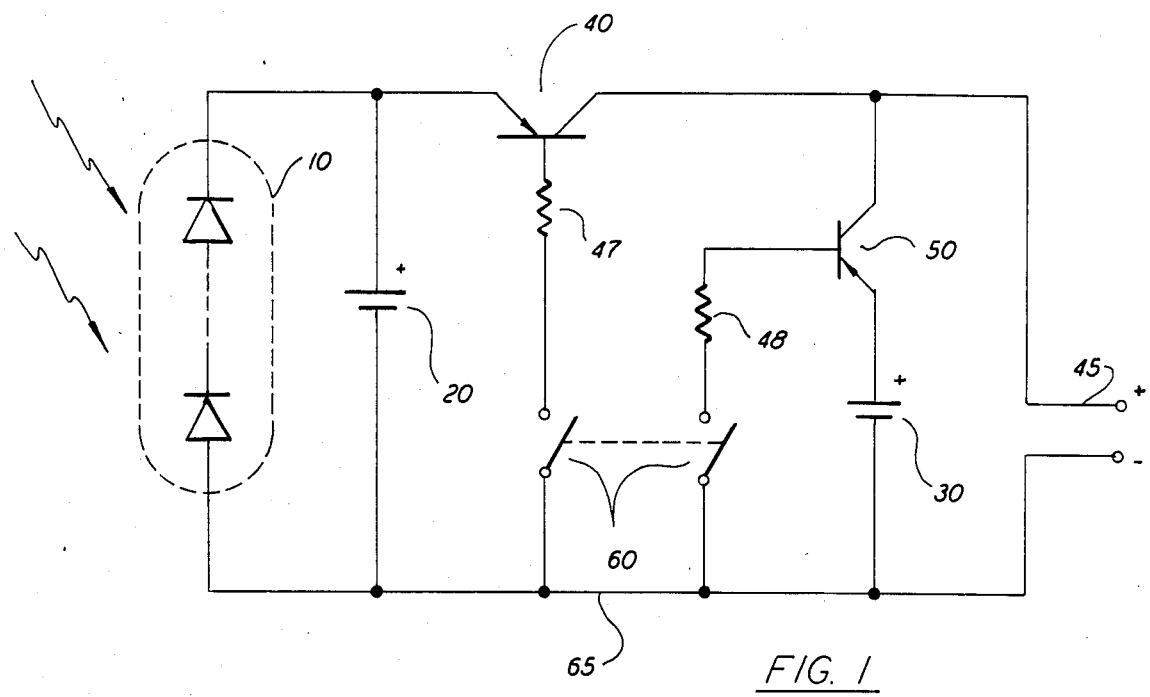
FIG. 1 is a schematic diagram of a first embodiment of the invention.
Figure 2:
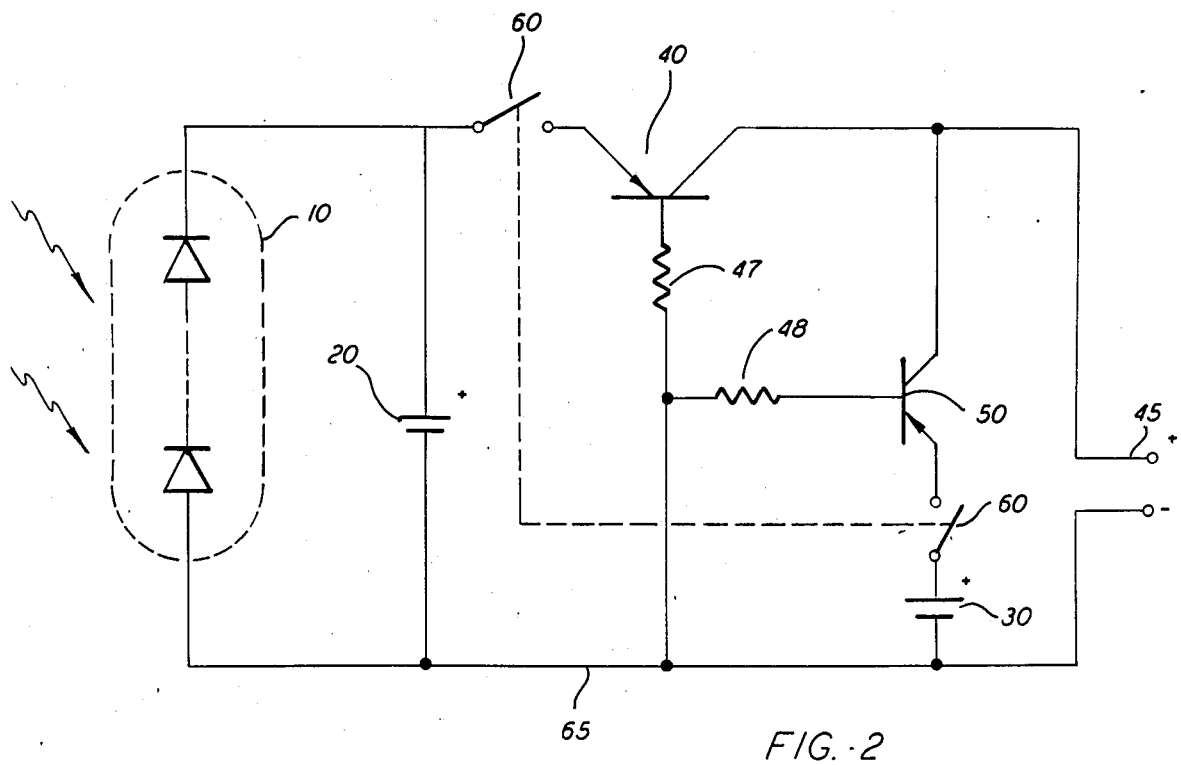
FIG. 2 is a schematic diagram of a second embodiment of the invention.

With reference now to the drawing figures, FIGS. 1 and 2 show two embodiments of the three-way power source circuit according to the invention. A first power source comprises a solar cell or a plurality of solar cells 10. Coupled in parallel to the solar cell 10, is a rechargeable battery 20, such as a nickel cadmium battery. A third power source 30 comprising a standard dry cell, for example, an alkaline cell, manganese cell or a lead-zinc dry cell, is also provided. A first isolating device 40, for example a transistor, is coupled between the output of solar cell 10 and rechargeable battery 20 and an output 45 of the circuit. A second isolating device 50, for example, a transistor, is coupled between the standard dry cell 30 and output 45. In a first embodiment shown in FIG. 1, the control electrodes of the isolating devices 40 and 50 are connected by respective resistors 47 and 48 to respective poles of a double pole switch 60 to the return line 65 of the power source circuit. The two poles of the switch 60 are mechanically operated together In FIG. 2, the two poles of switch 60 are provided in the emitter-collector circuit of the transistors 40 and 50 to prevent even negligible current flow through the emitter-collector junction of the transistors 40 and 50 and resistors 47 and 48 are coupled directly to return line 65.

As shown, the solar cell 10 and the rechargeable cell 20 are connected in parallel with each other. Exposing the solar cell 10 to sunlight or artificial light will generate current to charge the rechargeable cell 20 and power the operation of the portable electronic device connected thereto. The rechargeable cell 20 will, accordingly, reach full charge sooner when switch 60 is placed in the off condition, and the portable electronic apparatus thus is not receiving power.

The portable electronic equipment may be operated without an adequate source of light utilizing the energy stored in either the rechargeable cell 20 or the standard dry cell 30. When the rechargeable battery 20 is depleted, and an adequate source of light is not present, the portable electronic equipment may still be operated by the insertion of a fresh dry cell 30. A fresh dry cell 30 typically exhibits a characteristic output voltage of approximately 1.5 volts. A fully rechargeable cell typically exhibits a characteristic output voltage of approximately 1.2 volts. The battery 20 or 30 with the greater voltage potential will provide the greater source of energy to operate the portable electronic equipment. In a typical application, the portable electronic equipment, for example, a radio, may require a minimum rated voltage of 0.9 volts. Of course, a number of batteries can be provided in series or parallel, in accordance with voltage and current requirements.

Transistors 40 and 50 provide unilateral isolation between the rechargeable cell 20 and dry cell 30 with a very low voltage drop between the emitter and the collector providing greater usable energy to operate the portable electronic equipment.

With a fresh dry cell rated at 1.5 volts in place to operate the portable equipment, the solar cells 10 will primarily provide energy to recharge the rechargeable cell 20 to 1.2 volts when the solar cells 10 are exposed to an adequate source of light. With the depletion of some of the energy from the dry cell 30, and when the voltage potential of the dry cell 30 equals that of the rechargeable cell 20, both cells 20 and 30 will automatically and proportionately share the load to operate the portable electronic equipment.

Additional depletion of some of the energy from the dry cell 30 below that of the rechargeable cell 20 will make the rechargeable cell 20 and solar cell 10 the principal energy source to operate the portable electronic equipment. Thus, the usable life of the replaceable dry cell 30 will be extended.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A three-way power source circuit for portable electronic equipment comprising:
   means for deriving power from a solar energy source;
   rechargeable battery means coupled across said means for deriving power from a solar energy source;
   nonrechargeable battery means;
   first isolating means coupling said means for deriving power from a solar energy source and said rechargeable battery means to a common point; and
   second isolating means for coupling said nonrechargeable battery means to said common point, said common point being coupled to said portable electronic equipment for supplying power thereto.

2. The power source circuit recited in claim 1, wherein said first and second isolating means comprise transistor means.

3. The power source circuit recited in claim 2, wherein said first and second isolating means further comprise resistor means coupling control terminals of said transistor means to a return line of said power source circuit.

4. The power source circuit recited in claim 1, further comprising switch means for substantially eliminating the flow of current from said means for deriving power from a solar energy source, said rechargeable battery means and said nonrechargeable battery means to said portable electronic equipment.

5. The power source circuit recited in claim 4, wherein said switch means is disposed between a control input of said first and second isolating means and a return line of said power source circuit.

6. The power source circuit recited in claim 4, wherein said switch means is disposed in series with said first and second isolating means.

* * * * *